United States Patent
Smith et al.

(10) Patent No.: US 9,803,553 B2
(45) Date of Patent: Oct. 31, 2017

(54) METHOD TO CONTROL ELECTRIC STARTER GENERATOR FOR GAS TURBINE ENGINES

(71) Applicants: Rolls-Royce North American Technologies, Inc., Indianapolis, IN (US); Rolls-Royce Corporation, Indianapolis, IN (US)

(72) Inventors: Alan W. Smith, Columbus, IN (US); Mark J. Blackwelder, Plainfield, IN (US)

(73) Assignees: Rolls-Royce North American Technologies, Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 352 days.

(21) Appl. No.: 14/691,925

(22) Filed: Apr. 21, 2015

(65) Prior Publication Data
US 2015/0308347 A1    Oct. 29, 2015

Related U.S. Application Data

(60) Provisional application No. 61/984,081, filed on Apr. 25, 2014.

(51) Int. Cl.
*F02C 7/22* (2006.01)
*F02C 7/26* (2006.01)
(Continued)

(52) U.S. Cl.
CPC .............. *F02C 7/26* (2013.01); *F01D 15/10* (2013.01); *F01D 19/02* (2013.01); *F01D 21/12* (2013.01);
(Continued)

(58) Field of Classification Search
CPC .......... F01D 15/10; F01D 19/02; F01D 21/12; F02C 6/14; F02C 7/14; F02C 7/26;
(Continued)

(56) References Cited

U.S. PATENT DOCUMENTS 5,107,674 A     4/1992   Wibbelsman et al.
5,748,500 A  *  5/1998   Quentin .................. G07C 3/00
                                                    702/182

(Continued)

OTHER PUBLICATIONS

International Search Report, dated Sep. 21, 2015, 3 pages.

*Primary Examiner* — Jesse Bogue
(74) *Attorney, Agent, or Firm* — Fishman Stewart PLLC

(57) ABSTRACT

A gas turbine engine starting system including an electric start generator (ESG) free of temperature sensors and configured to provide torque to a gas turbine engine. A fuel metering module is configured to provide a quantity of fuel to the gas turbine engine, and an electronic control system (ECS). The ESG includes a plurality of subcomponents. The ECS is configured to predict a future temperature of the ESG, predict that at an ongoing start or an uninitiated start will be unsuccessful, and provide the prediction that at an ongoing start or an uninitiated start will be unsuccessful to an operator. The prediction of the future temperature of the ESG is based on a plurality of historical ESG thermal trending information and an input ambient temperature. The prediction that at an ongoing start or an uninitiated start will be unsuccessful is based on the future temperature of the ESG.

20 Claims, 6 Drawing Sheets

(51) Int. Cl.
*F01D 15/10* (2006.01)
*F01D 19/02* (2006.01)
*F01D 21/12* (2006.01)
*F02K 3/06* (2006.01)
*F02C 6/14* (2006.01)
*F02C 7/14* (2006.01)
*F02C 7/275* (2006.01)
*F02C 9/28* (2006.01)
*G05B 23/02* (2006.01)

(52) U.S. Cl.
CPC ............ *F02C 6/14* (2013.01); *F02C 7/14* (2013.01); *F02C 7/275* (2013.01); *F02C 9/28* (2013.01); *F02K 3/06* (2013.01); *G05B 23/0232* (2013.01); *G05B 23/0286* (2013.01); F05D 2220/32 (2013.01); F05D 2220/76 (2013.01); F05D 2230/72 (2013.01); F05D 2260/80 (2013.01); F05D 2260/821 (2013.01); F05D 2260/85 (2013.01); F05D 2270/112 (2013.01); F05D 2270/303 (2013.01); F05D 2270/71 (2013.01); Y02T 50/675 (2013.01)

(58) Field of Classification Search
CPC .... F02C 7/275; F02C 9/28; F02K 3/06; F05D 2220/32; F05D 2220/76; F05D 2230/72; F05D 2260/80; F05D 2260/821; F05D 2260/85
See application file for complete search history.

(56) References Cited

U.S. PATENT DOCUMENTS

| | | | |
|---|---|---|---|
| 6,018,941 A | 2/2000 | Massey | |
| 6,035,626 A * | 3/2000 | Wahl | F02C 7/275 290/40 A |
| 6,134,875 A | 10/2000 | Massey | |
| 6,836,086 B1 | 12/2004 | Goldberg et al. | |
| 7,448,220 B2 * | 11/2008 | Schmidt | F01D 25/18 60/786 |
| 7,506,517 B2 | 3/2009 | Uluyol et al. | |
| 7,690,205 B2 | 4/2010 | Delaloye et al. | |
| 7,810,337 B2 * | 10/2010 | Baker | F02C 7/275 290/52 |
| 7,840,333 B2 | 11/2010 | Mehrer et al. | |
| 8,245,517 B2 | 8/2012 | Tong et al. | |
| 2004/0237537 A1* | 12/2004 | McKelvey | F02C 7/26 60/773 |
| 2007/0234734 A1* | 10/2007 | Uluyol | F02C 7/26 60/778 |
| 2007/0234739 A1* | 10/2007 | Delaloye | F01D 19/00 60/786 |
| 2010/0107648 A1 | 5/2010 | Bulin et al. | |
| 2010/0293961 A1* | 11/2010 | Tong | F01D 19/00 60/778 |
| 2011/0259016 A1 | 10/2011 | Winston et al. | |
| 2011/0289934 A1 | 12/2011 | Desabhatla | |
| 2013/0204506 A1 | 8/2013 | Ertz et al. | |
| 2013/0278229 A1* | 10/2013 | Chai | H02M 7/487 322/94 |
| 2015/0005990 A1* | 1/2015 | Burns | B64D 31/14 701/3 |

\* cited by examiner

METHOD TO CONTROL ELECTRIC STARTER GENERATOR FOR GAS TURBINE ENGINES

CROSS-REFERENCE TO RELATED APPLICATIONS

This application claims priority to U.S. Provisional Patent Application No. 61/984,081, filed Apr. 25, 2014, the contents of which are hereby incorporated in their entirety.

FIELD OF TECHNOLOGY

An improved control and health management approach for starting a gas turbine engine is disclosed. The improvements are applicable to turbines used for propulsive power in marine, land, air, and underwater applications, as examples.

BACKGROUND

It has become increasingly desirable to improve the overall system design and operation of gas turbines. In a system having a typical gas turbine engine, an engine starting system provides torque to the gas turbine engine to start the engine. An unsuccessful engine start, however, can lead to delay, additional engine cycles reducing engine life, and may also damage the engine and/or systems thereof.

Accordingly, there is room for further improvements in this area.

According to the present disclosure, there is provided an improved system for controlling an electric starter generator for an engine, as set forth in the appended claims.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

An exemplary gas turbine engine and schematic of an electrical system coupled thereto are described herein and are shown in the attached drawings. The electrical system includes at least one electrical starter generator (ESG) coupled to a high pressure portion of a gas turbine engine.

Figure 1:
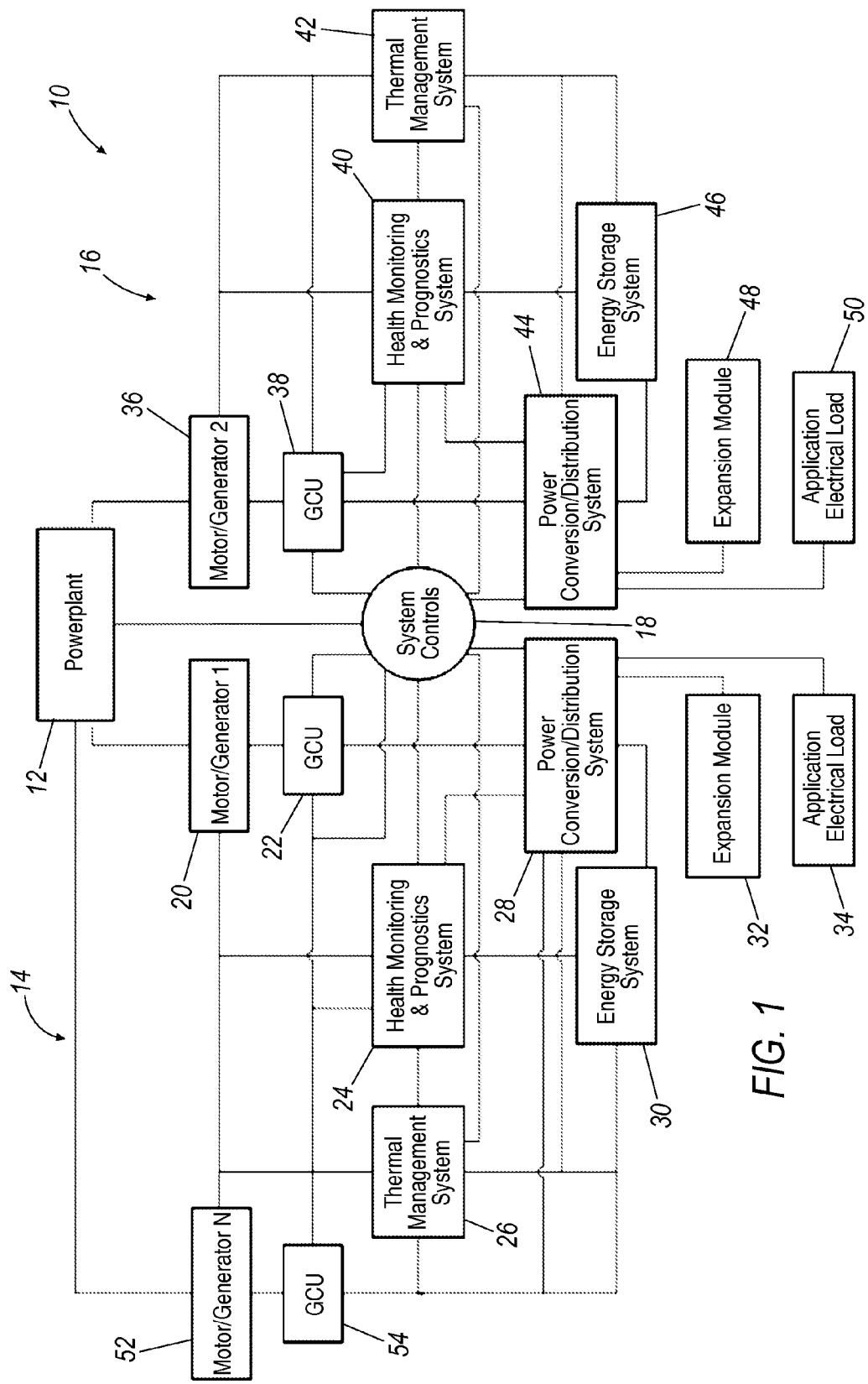
FIG. 1 is a schematic illustration of an electrical system coupled to a gas turbine engine, according to one example.

FIG. 1 illustrates an electrical system 10 in which a power plant or engine 12, such as a gas turbine engine, provides electrical power to a first power circuit 14 and a second power circuit 16. A system controller 18 is coupled to engine 12 and also to first and second circuits 14, 16. First power circuit 14 includes a motor/generator 20 and a General Control Unit (GCU) 22 coupled thereto. GCU 22 is also coupled to other components within first power circuit 14, such as a health monitoring and prognostics system 24, a thermal management system 26, and a power conversion/distribution system 28. First power circuit 14 also includes an energy storage system 30, an expansion module 32, and application electrical load(s) 34. System controller 18 is configured to regulate power flow (such as electrical currents and voltages within system 10) to provide power to various electrical busses. The power may be DC, AC, or conversion therebetween. System controller 18 may also be configured to execute computer program instructions to control the operation of engine 12, including fuel flow, or the position of any variable geometry systems (e.g., from the flight control system of an aircraft or from a steering system of a ship).

Health monitoring and prognostics system 24 is generally a unit that monitors the health of system components, and may be used to estimate component life based on sensor feedback received from components within engine 12. Thermal management system 26 includes pumps, expansion valves, and the like, as well as a controller, to provide coolant for the purposes of climate control, and other system operations. Power conversion/distribution system 28 receives electrical power from motor/generator 20 via GCU 22, and converts the power to a more useable form such as a DC voltage for storage in energy storage system 30, expansion module 32, and application electrical load(s) 34. The energy storage system 30 may include a battery or other energy storage system. Energy storage system 30 stores energy for providing power when engine 12 is not running (i.e., not generating power), but also to provide power to motor/generator 20 to provide starting power to engine 12 during startup. Expansion module 32 and application electrical load 34 represent additional electrical components that receive power from power conversion/distribution system 28.

Second power circuit 16 similarly includes a motor/generator 36 and a GCU 38 coupled thereto. GCU 38 is also coupled to other components within second power circuit 16, such as a health monitoring and prognostics system 40, a thermal management system 42, and a power conversion/distribution system 44. Second power circuit 16 also includes an energy storage system 46, an expansion module 48, and application electrical load(s) 50. The components 36-50 of second power circuit 16 are similarly arranged as described with respect to first power circuit 14. Additionally, in one example electrical system 10 includes one or more additional motor/generators 52 and corresponding GCUs 54 as well, which may be coupled to a gas turbine engine as will be further described. Thus, the system 10 is modular and flexible in that it may be expanded to include a number N of motor/generators based on contemplated operating conditions.

Figure 2:
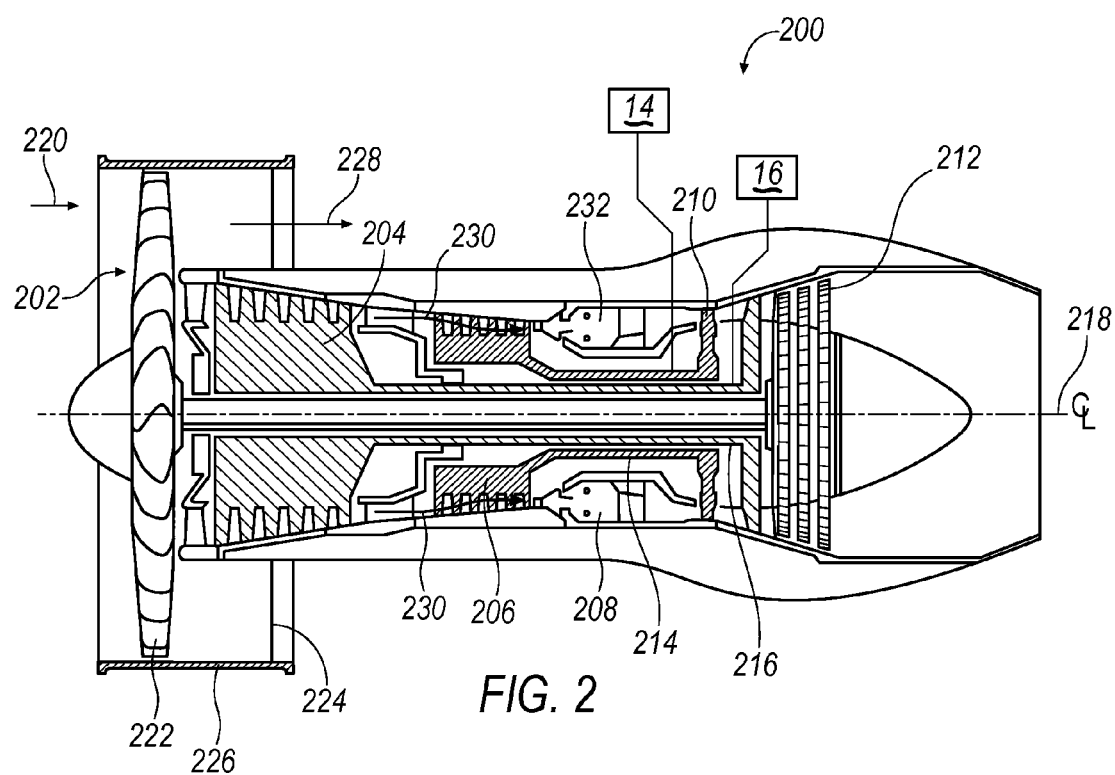
FIG. 2 illustrates an exemplary gas turbine engine that incorporates the electrical system illustrated in FIG. 1.

FIG. 2 illustrates a gas turbine engine 200, which includes a fan 202, a low pressure compressor and a high pressure compressor, 204 and 206, a combustor 208, and a high pressure turbine and low pressure turbine, 210 and 212, respectively. The high pressure compressor 206 is connected to a first rotor shaft 214 while the low pressure compressor 204 is connected to a second rotor shaft 216. The shafts extend axially and are parallel to a longitudinal center line axis 218. Ambient air 220 enters the fan 202 and is directed across a fan rotor 222 in an annular duct 224, which in part is circumscribed by fan case 226. Bypass airflow 228 provides engine thrust while a primary gas stream 230 is directed to a combustor 232 and the high pressure turbine 210.

First and second rotor shafts 214, 216, are coupled, respectively, to first and second power circuits 14, 16, as illustrated in FIG. 1. Thus, first and second power circuits 14, 16 are configured to split power between motor/generators 20, 36 so that each provides a portion of the power demand. As such, a power sharing/transfer arrangement between motor/generators 20, 36 provides the platform power demand, and includes a capability to provide power to one of the shafts 214, 216, as necessary. Such arrangement also provides an ability to optimize load shedding and a demand side management of the power requirement. Thus, life and performance considerations may be taken into account in real-time and optimized to actively seek and obtain performance optima while equipment is in operation.

Torque from the ESG is typically applied to the first or HP rotor of the engine to be able to apply torque to the HP spool and thereby start the engine.

Figure 3A:
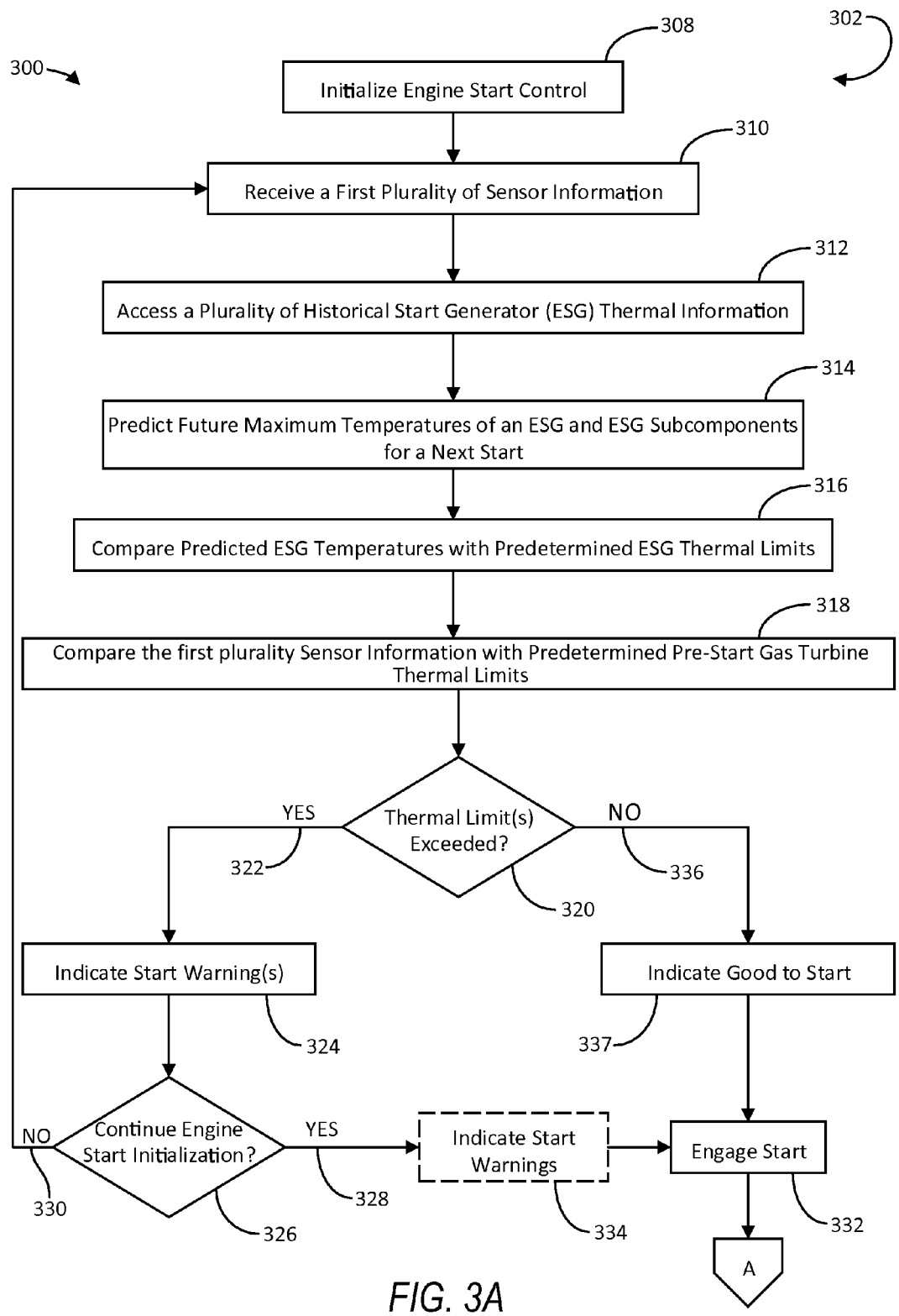
FIG. 3A is a flowchart illustrating an engine starting technique according to an embodiment.
Figure 3B:
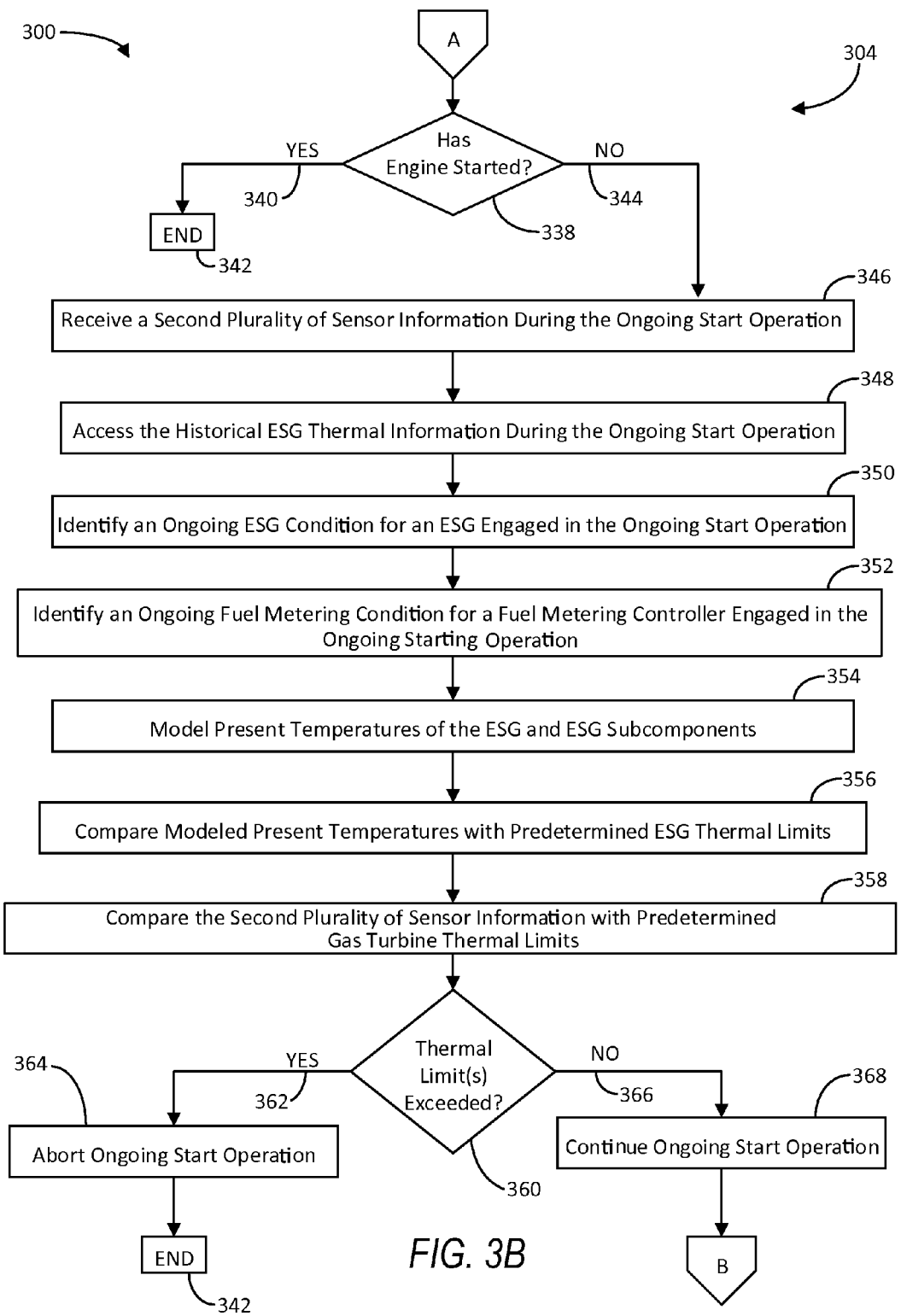
FIG. 3B is a flowchart illustrating an engine starting technique according to an embodiment.
Figure 3C:
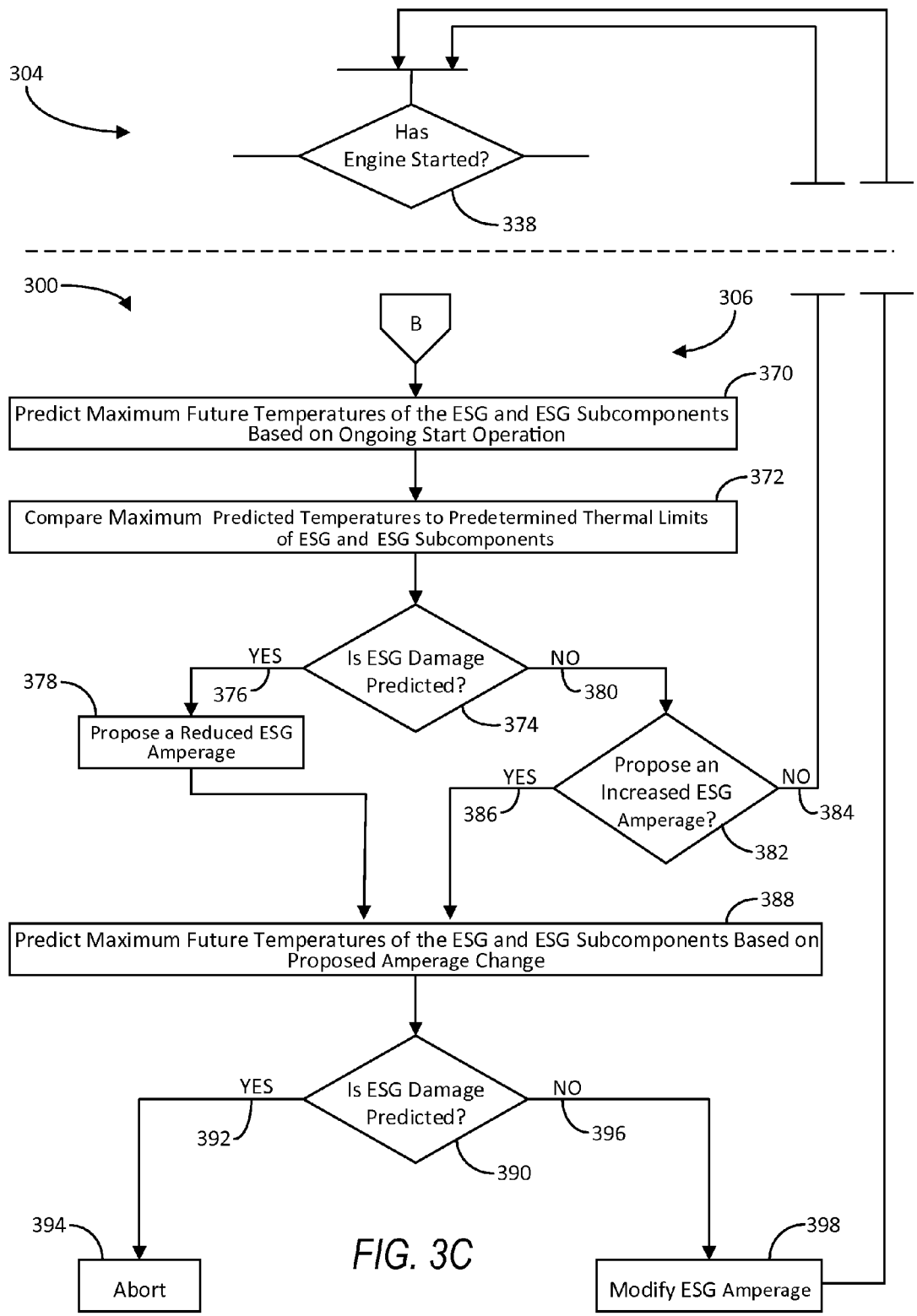
FIG. 3C is a flowchart illustrating an engine starting technique according to an embodiment.

With reference now to FIGS. 3A-3C, a procedure 300 for starting a gas turbine engine is shown according to an embodiment. The procedure 300 is employed to protect a gas turbine engine and an electric start generator (ESG) being employed to start the gas turbine engine. As shown in the flowchart of FIG. 3A, the procedure 300 includes a health management technique 302 employed prior to an engine start. As shown in the flowchart of FIG. 3B, the procedure 300 includes a control technique 304 employed during an ongoing start operation. Further, as shown in the flowchart of FIG. 3C, the procedure 300 includes a control technique 306 employed during continued ongoing operation. It is contemplated that techniques 302, 304 and/or 306 may be employed together or independently of each other by an embodiment of this disclosure.

Referring now to FIG. 3A, the control technique 302 employed during an ongoing start operation is shown according to an embodiment. The control technique 302 of starting procedure 300 begins at block 308, where an engine start control is initialized. Engine start control may, for example, be initialized by an operator such as a pilot. It is noted that an initialized engine start control is preliminary to an engine start and does not include providing fuel or ESG torque to the gas turbine engine. After engine start control is initialized, process control proceeds to block 310, where a plurality of sensor information is received. It is contemplated that an electronic control system such as a full authority digital engine controller (FADEC) or a distributed control system may receive the plurality of sensor information. Sensor information includes sensed data from one or more systems of the gas turbine engine or systems associated therewith. For example, the sensor information may include a sensed ESG coil resistance, a sensed turbine engine temperature, a sensed coolant temperature, and/or a sensed ambient temperature. It is noted that the sensed coolant temperature may, for example, be a sensed engine oil temperature, since oil is often employed as a coolant in addition to being employed as a lubricant. Further, it is also noted that the reception of other sensed information is contemplated.

Process control then proceeds to block 312 where a plurality of historical ESG thermal information is accessed. Historical ESG thermal information is predetermined information gathered from ESG research about the operation of ESGs during a variety of thermal states. For example, it is contemplated that the historical ESG thermal information may include thermal trending information related to ESG cooling paths, ESG heat capacity (e.g., a historic trend of heat capacity values over a temperature range), ESG heat generation, ESG subcomponent heat capacities, and other information associated with ESGs and ESG subcomponents. Further, it is contemplated that the historical ESG thermal information may also include empirically derived ESG thermal characteristics.

Though technique 302 illustrates that the sensor information at block 310 is received prior to accessing the historical ESG thermal information at block 312, it is contemplated that the historical ESG thermal information may be accessed prior to receiving the sensor information or at the same time the sensor information is received.

With continued reference to FIG. 3A, after the plurality of historical ESG thermal information is accessed, process control proceeds to block 314, where future maximum or close to maximum temperatures of an ESG and ESG subcomponents are predicted. These maximum or close to maximum temperature predictions can be considered "worst-case" temperature predictions and correspond to an upcoming or "next" start. The predictions of the ESG and ESG subcomponents temperatures are based on the historical ESG thermal information accessed at block 312 and the sensor information received at block 310. It is contemplated that the historical ESG thermal information is manipulated into a thermal model and a system controller inputs sensor information into the thermal model to predict the ESG and ESG subcomponent temperatures. Further information regarding the prediction of the ESG and ESG subcomponent temperatures will be set forth in detail below with respect to FIGS. 3B-4.

With continued reference to FIG. 3A, after the ESG and ESG subcomponent temperatures are predicted at block 314, process control proceeds to block 316, where the predicted "worst-case" ESG temperatures are compared with predetermined ESG thermal limits. For example, the ESG thermal limits may include an ESG temperature limit as well as a temperature limit for each of the ESG subcomponents.

Process control then proceeds to block 318 and the sensor information received at block 310 are compared with predetermined pre-start gas turbine thermal limits. For example, a sensed engine temperature may be compared with a pre-start engine temperature limit and/or a sensed engine oil temperature may be compared with a pre-start oil temperature limit.

It is contemplated the comparison of the ESG temperatures with the ESG thermal limits may occur after or during the comparison of the sensor information with the pre-start gas turbine thermal limits, instead of before as shown in FIG. 3A.

Still referring to FIG. 3A, after the sensor information is compared with the pre-start gas turbine thermal limits at block 318, process control proceeds to decision block 320, where it is determine whether any of the thermal limits set forth in blocks 316 and 318 are exceeded.

If any of the thermal limits are exceeded 322, process control proceeds to 324, where a start warning or prediction is indicated to an operator such as a pilot. A range of status warnings could be shown. For example, green, yellow, or red status warnings may be indicated or provided to the operator.

Red may, for example, indicate a predicted high degree of failure and/or resulting damage. Yellow and green, on the other hand, may respectively indicate predicted lower degrees of failure and/or resulting damage.

Process control then proceeds to decision block 326 where the operator is given the opportunity to continue 328 initialization of a start or discontinue 330 with initialization of the start. If the operator decides not to continue 330 the start procedure, process control proceeds back to block 310, where sensor information is received once again and technique 302 continues. As such, neither the ESG provides torque to the gas turbine nor does a fuel metering module provide fuel to the gas turbine.

On the other hand, if the operator decides to continue with initialization of a start 328, process control proceeds to block 332 where a start is engaged or initiated. As such, the ESG provides torque to the gas turbine and the fuel metering module provides fuel to the engine at the appropriate engine speed.

It is contemplated that, prior to engaging an engine start at block 332, further start warnings may be indicated to the operator at block 334 (shown in phantom).

Referring back to decision block 320, if it is determined that none of the thermal limits are exceeded 336, process control proceeds to block 337, where a "good to start" indication or prediction is shown to the operator. A start procedure is then engaged or initiated at block 332. Accordingly, fuel and ESG torque are provided to the gas turbine. It is contemplated that the fuel and ESG torque provided are predetermined. Alternatively, it is contemplated that the fuel and ESG torque provided are determined based on the thermal conditions of the turbine engine and ESG. As such, model based ESG temperature predictions are employed to determine optimum, or close to optimum, fueling and ESG current (i.e., amperage) during a start to balance the damage and life usage for the engine and ESG system. In other words, a balance between the ESG amperage and engine fueling during a start may be determined to maximize or at least increase engine and/or ESG component life.

As illustrated in FIG. 3A, technique 302 is employed to protect the health of the ESG and the gas turbine engine by minimizing the chance that either the temperature of the ESG, ESG subcomponents, and/or the gas turbine engine will go beyond relevant thermal limits and possibly cause corresponding damage when a start procedure is engaged. As such, when employed, starting technique 302 helps to protect an ESG, ESG subcomponents, and/or a gas turbine engine.

With reference now to FIG. 3B, a flowchart illustrates the control technique 304 (i.e., another starting technique) employed during an ongoing start operation according to an embodiment.

Procedure 300 continues and process control begins technique 304 at decision block 338, where it is determined if the engine has started. If the start was successful 340, process control proceeds to an end at 342.

Alternatively, if the ongoing start operation was not successfully completed 344, process control proceeds to block 346, where a second plurality of sensor information is received during the ongoing start operation. The second plurality of sensor information includes sensed data from one or more systems of the gas turbine engine. For example, the sensor information may include engine high pressure rotor speed, a sensed ESG stator amperage feedback, a sensed ESG field amperage feedback, a sensed engine turbine temperature, a sensed coolant temperature, and/or a sensed ambient temperature. The sensor information may also include sensed temperatures of cooling circuits adjacent to the ESG. It is noted that the sensed coolant temperature may, for example, be a sensed engine oil temperature. Further, the sensor information received at block 346 is associated with states of the one or more systems of the gas turbine engine during the ongoing start operation. Accordingly, the sensor information may be different than the sensor information received at block 310 of FIG. 3A. Further, it is contemplated that the sensor information is free of sensed ESG temperature information.

With continued reference to FIG. 3B, after the plurality of sensor information is received at block 346, process control proceeds to block 348 and the plurality of historical ESG thermal information, which includes empirically derived ESG thermal characteristics, is accessed. As discussed above with respect to FIG. 3A, it is contemplated that the historical ESG thermal information includes thermal trending information related to ESG cooling paths and heat generation information associated with ESGs and ESG subcomponents.

After the historical ESG thermal information is accessed, process control moves to block 350 of FIG. 3B and an ongoing ESG condition for the ESG engaged in the current ongoing staring operation is identified. It is contemplated that the ongoing ESG condition may be identified from stator amperage feedback information and field amperage feedback information. As such, it is contemplated that an ongoing ESG condition includes a stator amperage state and a field amperage state. However, additional or other ESG properties may serve as an ESG condition. For example, currently provided ESG torque may serve as an ongoing ESG condition.

Process control then proceeds to block 352, where an ongoing fuel metering condition for a fuel metering controller or module (e.g., a fuel metering valve) engaged in the ongoing start operation is identified. The ongoing fuel metering condition may be identified in a variety of ways. For example, the ongoing fuel metering condition may be identified in the plurality of sensor information received at block 346. That is, the ongoing fuel metering condition may be a sensed output of the fuel metering module.

It is noted that process control need not proceed through blocks 346-352 in the order shown in FIG. 3B. The order in which the sensor information is received, the historical ESG thermal information is accessed, and the ongoing ESG and thermal metering conditions are identified may vary. Indeed, according to an embodiment, some or all of the procedures of blocks 346-352 may occur at the same time.

Referring back to the FIG. 3B, after the ongoing fuel metering condition is identified at block 352, present temperatures of the ESG and ESG subcomponents are modeled at block 354. That is, a present temperature of the ESG and ESG subcomponents is determined based on a thermal model. The modeling of the ESG temperature is based on the sensor information received at block 346, the historical ESG thermal information accessed at block 348, and the ongoing ESG and fuel metering conditions identified at blocks 350 and 352, respectively. Effectively, the historical ESG thermal information is arranged as a model and the sensor information and the ongoing ESG and flow metering start conditions are input into the thermal model to determine the modeled temperatures of the ESG and ESG subcomponents.

Once the ESG and ESG subcomponent temperatures are determined through modeling, process control proceeds to block 356, where the modeled ESG present temperatures are compared to known ESG thermal limits. In other words, the modeled ESG temperature and the plurality of modeled ESG subcomponent temperatures are compared respectively to a known ESG thermal limit and a plurality of known ESG subcomponent thermal limits.

After comparing the present modeled ESG temperatures with known ESG thermal limits at block 356, process control proceeds to block 358, where the engine sensor information is compared with known or predetermined gas turbine system thermal limits. For example, a sensed engine temperature may be compared with a known engine thermal limit.

At decision block 360, it is determined if the modeled or determined ESG temperature(s) and sensed gas turbine system temperatures exceed any respective thermal limits. If any of the thermal limits are exceeded 362, process control proceeds to block 364 and the ongoing start condition is aborted. Accordingly, thermal runaway in the ESG and or systems of the gas turbine engine may be avoided. As such, thermal damage to the ESG and systems of the gas turbine engine may be avoided or minimized. Process control then proceeds to end at 342.

If, on the other hand, it is determined at decision block 360 that thermal limits have not been exceeded 366, process control proceeds to block 368 and the ongoing start procedure is continued.

As set forth in FIG. 3B, technique 304 helps to avoid thermal damage to an ESG and systems of a gas turbine engine during an ongoing start operation. Since historical ESG thermal information is employed, it is contemplated that technique 304 may be carried out by engine controllers (not shown) that control ESGs free of thermal sensors. As such, weight and costs may be minimized.

With reference now to FIG. 3C, a flowchart illustrates technique 306 employed during the continued ongoing start operation according to an embodiment. Technique 306 may be employed to predict future temperatures of the ESG engaged in the ongoing start operation and/or predict ESG temperatures engaged in a hypothetical operating condition.

Procedure 300 continues, and technique 306 begins with the prediction of future maximum or close to maximum temperatures of the ESG and ESG subcomponents based on the ongoing start operation at block 370. In other words, projections are made as to what will be the "worst-case" temperatures of the ESG and ESG subcomponents in the future if the current ongoing start procedure continues. It is contemplated that future ESG temperature predictions are based on the second plurality of sensor information received at block 346 of FIG. 3B, the accessed historical ESG thermal information accessed at block 348, and the ongoing ESG condition identified at block 350, also of FIG. 3B. Instead of using the present modelled temperature of the ESG and ESG subcomponents, a thermal model of the ESG or ESG subcomponents is employed to predict temperatures of the ESG and ESG subcomponents at a future time. It is contemplated that the future time interval may be based on a predetermined value.

Once the future ESG and ESG subcomponent temperatures are predicted, process control proceeds to block 372 and the predicted maximum or close to maximum temperatures are compared to known ESG and ESG subcomponent thermal or temperature limits. At decision block 374, it is determined if damage to the ESG is predicted. In other words, it is determined whether or not any of the predicted or projected future "worst-case" ESG temperatures exceed respective thermal limits.

If ESG damage is predicted 376 (i.e., it is predicted that an the ESG or an ESG subcomponent will rise from a first temperature below a thermal limit to a second temperature above the thermal limit), process control proceeds to block 378 and a reduced ESG amperage is proposed to keep the ESG below corresponding thermal limit(s).

Referring back to decision block 374, if it is determined that ESG damage is not predicted 380 (i.e., it is not predicted that an ESG thermal limit will be exceeded), process control proceeds to decision block 382 and an increased ESG amperage is proposed. It will be appreciated that an electrical ESG increase in amperage can be employed to aid in an ongoing engine start if the start is hung or not accelerating adequately. Whether or not an increased ESG amperage is proposed may, for example, be based on the state of the engine and ESG or the acceleration of the engine during the start. For example if the acceleration of the engine during the start is adequate, an increased ESG amperage may not be proposed 384. Accordingly, process control then proceeds back to decision block 338 of technique 304, which is shown in detail in FIG. 3B. It is contemplated that if it is determined at decision block 338 of FIG. 3B that the engine has started 340, ESG temperature(s) may continue to be empirically monitored through thermal modeling in power generation mode. As such, health and life of the generator may be determined and overheat warnings may be provided. In addition, or alternatively, a user may be prompted to employ other sources of power generation if generator limits are exceeded.

Referring back to FIG. 3C, if it is determined at decision block 382 that increased amperage should be proposed 386 (e.g., the engine acceleration during the start is inadequate), process control proceeds to block 388 to predict maximum or close to maximum temperatures of the ESG and ESG subcomponents based on the proposed amperage change.

The proposed amperage change used for the temperature predictions at block 388 may be an increased amperage stemming from decision 386, or a reduced amperage from the proposed amperage reduction at block 378. It is contemplated that ESG thermal information be employed to carry out the predictions at block 388. That is, the historical ESG thermal information is manipulated into a thermal model. A hypothetical ESG operating condition based on the increased amperage, or reduced amperage, is then provided to the thermal model as an input so predictions of the ESG and ESG subcomponents temperatures can be made.

At decision block 390, it is then determined if these predicted temperatures will cause ESG damage (e.g., heat damage). If damage is predicted 392, process control proceeds to block 394 and the start is aborted.

Alternatively, if at decision block 390, it is determined that ESG damage is not predicted 396 (i.e., ESG and ESG subcomponent thermal limits are not predicted to be exceeded), process control proceeds to block 398, and ESG amperage is modified. Process control then proceeds to decision block 338 of technique 304, which is shown in detail in FIG. 3B.

As set forth above with respect to FIGS. 3A-C, procedure 300, in part, employs the initial start technique 302 to predict ESG temperatures prior to a start, technique 304 to model present ESG temperatures during an ongoing start, and technique 306 to predicts ESG temperatures during hypothetical future states of the ESG. Accordingly, model-based ESG temperature predictions or determinations are employed to determine whether engine start can be performed without exceeding ESG and/or ESG subcomponent temperature limits prior to and during an engine start process. In other words, a real-time ESG temperature model can be employed to assess ESG and ESG subcomponent temperature during a start to determine whether a start abort is needed to avoid ESG damage that may be permanent. These model based ESG temperatures allow for the determination of optimum, or close to optimum, fueling and ESG amperage during a start to balance damage and life usage for the engine and ESG system.

It is noted that the real-time ESG temperature model can be utilized to record information for ESG health monitoring and lifing. For example, the modeled thermal conditions for past starts and/or start attempts may be recorded. One or more trends may then be determined from the recorded information to monitor ESG health properties and/or make lifing predictions.

Though set forth as being aspects of procedure 300, it is contemplated that techniques 302-306 may be carried out independently of each other. That is an embodiment of this disclosure need not carry out each technique 302-306.

Figure 4:
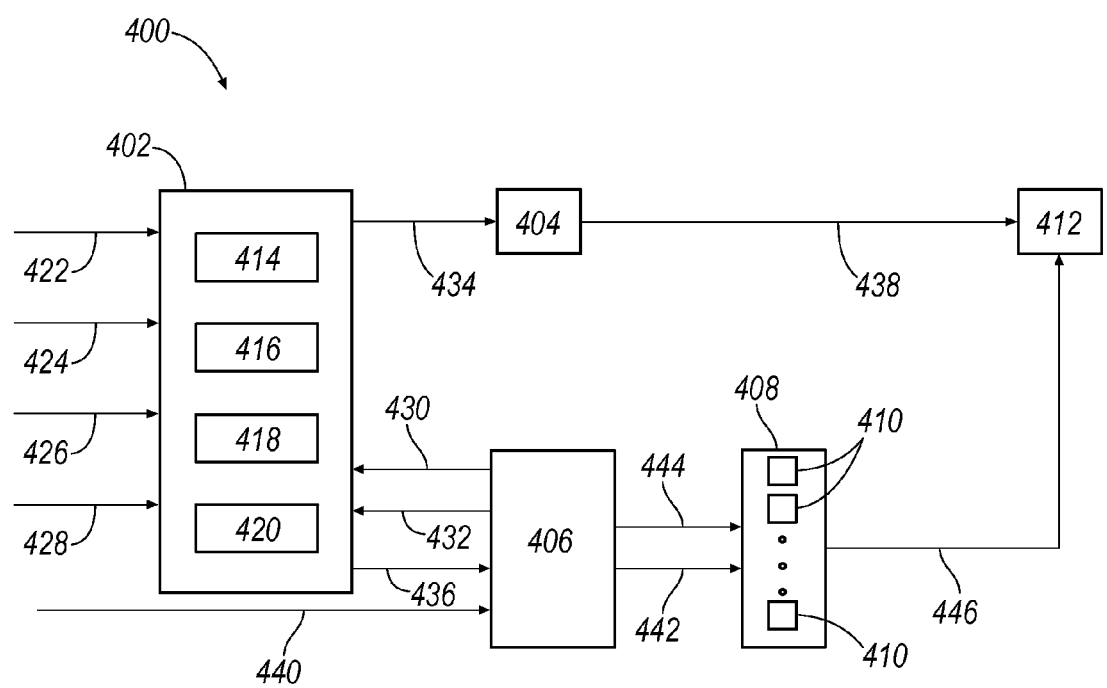
FIG. 4 is a block diagram of a system according to an embodiment.

With reference now to FIG. 4, a block diagram of a system 400 for carrying out a starting operation is shown according to an embodiment. System 400 includes a systems controller 402, a fuel metering valve (FMV) 404, a starting generator control unit (SGCU) 406, and an electric starting generator (ESG) 408 that comprises a plurality of subcomponents 410. The system 400 is coupled to a gas turbine 412.

It is contemplated that the systems controller 402 is an electronic engine controller (EEC) such as a FADEC. However, the systems controller 402 could be plurality of controllers (not shown). Referring to an embodiment depicted in FIG. 4, the systems controller 402 includes an ESG and engine lifing limits logic 414, an ESG thermal model 416 logic, a thermal stress predictor logic 418, an a engine start control 420.

The systems controller 402 receives a plurality of sensor information that includes a sensed engine speed 422, a sensed engine turbine temperature 424, a sensed coolant temperature 426 (e.g., a sensed oil temperature), and a sensed ambient air temperature 428. The systems controller 402 also receives a stator amperage feedback 430 and a field amperage feedback 432 from the SGCU 406. An embodiment employing other sensor information or additional sensor information is contemplated.

The systems controller 402 uses the sensed information 422-428 to determine FMV control information that is sent out as a FMV command 434 to the FMV 404. Further, the systems controller 402 also employs the sensed information 422-428 along with the stator amperage feedback 430 and the field amperage feedback 432 to determine ESG control information that is sent out as an ESG torque command 436 to the SGCU 406. Based on the FMV command 434, the FMV 404 provides a quantity of fuel 438 to the gas turbine 412 if the FMV command 434 does not set fuel to zero and the engine will generate torque based on the amount of fueling. The SGCU 406 employs the ESG torque command 436 to condition, via rectifiers and/or inverters (not shown), power from an aircraft power bus 440. The conditioned power is sent to the ESG 408 as a field amperage 442 and a stator amperage 444. In turn, the ESG 408 provides an ESG Torque 446 to the gas turbine 412 based on the field and stator amperages 442, 444, respectively.

According to an embodiment, the systems controller 402 employs the ESG and engine lifing limits logic 414, the ESG system thermal model 416, the start thermal stress predictor 418, and an engine start control 420 to determine the FMV command 434 and the ESG torque command 436. For example, the ESG system thermal model 416 uses historical thermal trending information associated with an ESG along with one or more of the plurality of sensor information 422-428 to predict thermal states of the ESG 408. These predicted thermal states may include an overall thermal state of the ESG 408 as well as thermal states of a plurality of ESG subcomponents 410. It is noted that it is contemplated that the ESG 408 may be free of temperature sensors (not shown). As such, according to an embodiment, sensed ESG temperatures would not be employed by the ESG system thermal model 416 to predict the ESG thermal states. An ESG free of temperature sensors helps to minimize costs and weight.

Upon determination of these predicted ESG thermal state(s) (e.g., predicted temperatures of the ESG 408 and/or predicted temperatures of ESG subcomponents 410), these prediction(s) along with sensor information such as the sensed engine speed 422, sensed engine temperature 424, sensed engine coolant temperature 426, and the sensed ambient air temperature 428 are compared to respective thermal limits using the ESG and engine lifing limits logic 414.

If, for example, it is determined by the ESG and engine lifing limits logic 414 that the sensed temperature information and/or predicted ESG thermal temperature(s) are beyond known thermal or temperature limits, the engine start control 420 can abort an ongoing starting operation or leave a starting a starting operation uninitiated (i.e., avoid a new start). If the starting operation were an ongoing operation and thermal limit(s) were exceeded, the systems controller 402 would send FMV command 434 to the FMV 404 to cause the FMV 404 to cease sending fuel 438 to the gas turbine 412. Further, systems controller 402 would also send a cease command as the ESG Torque command 436 to the SGCU 406, which in turn would cease sending the field amperage 442 and the stator amperage 444 to the ESG 408. As such, the ESG 408 would not provide the ESG torque 446 to the gas turbine 412. In other words, neither the FMV 404 nor the ESG 408 would cause fuel or torque, respectively, to be provided to the gas turbine 412.

Alternatively, if there was not an ongoing starting procedure (i.e., a start had not yet begun), FMV command 434 would not be sent to the FMV 404 and an ESG Torque command 436 would not be sent to the SGCU 406.

On the other hand, if it is determined by the ESG and engine lifing limits logic 414 that the sensed temperatures associated with the gas turbine and the predicted ESG temperature determined by the ESG system thermal model 416 do not exceed abort limits, the systems controller 402 will continue monitoring the thermal state of the gas turbine 412 and predicting the thermal state(s) of the ESG 408 and comparing theses thermal states with thermal limits via the ESG and engine lifing limits logic 414.

Not only does the systems controller 402 monitor ongoing thermal states of the gas turbine 412 and the ESG 408, the systems controller 402 may also predict future states of the gas turbine 412 and the ESG 408. According to an embodiment, the engine start control 420 employs information from the start thermal stress predictor 418 to predict future states of the gas turbine 412 and the ESG 408. For example, the start thermal stress predictor 418 may predict if an ongoing start operation is left unchanged, damage to the ESG 408 and/or the gas turbine 412 will likely result. If it predicted that the ongoing start operation will likely cause damage to the ESG 408, the engine start control 420 may modify or abort ESG torque commands 436 and FMV commands 434 to protect the ESG 408 and the gas turbine 412.

The start thermal stress predictor 418 may also predict what would happen to the ESG 408 if an increase in ESG amperage were sent to the ESG 408 via the SGCU 406 to increase the likelihood of a successful start. It will be appreciated that increased amperage can positively affect the chances of a successful start. The start thermal stress predictor 418 may employ some or all of the sensor information 422-428 along with the ESG system thermal model 416 to predict ESG thermal state(s) if increased amperage were injected into the ESG 408. The ESG and engine lifing limits logic 414 would then compare these predicted thermal state(s) with known ESG thermal limits. If it is determine that the predicted thermal states do not exceed the predetermined ESG thermal limit, the engine start control 420 may cause an amperage increase command to be sent via the ESG torque command 436. Accordingly, the chances of a successful start are increased while the chance of damage to the ESG 408 is minimized.

Alternatively, if the ESG and engine lifing limits logic 414 determines that the predicted thermal states exceed one or more corresponding predetermined thermal limits, the engine start control 420 can ensure that an amperage increase command is not sent to the SGCU 406 as the ESG torque command 436. Further, the engine start control 420 may be employed to adjust the ESG torque command 436 and the FMV command 434 to increase the life of the ESG 408 and gas turbine 412. That is, a compromise or balance between ESG amperage and engine fueling may be determined to maximize the lifespan of the ESG 408 and the gas turbine 412.

It is also contemplated that a technique such as the initial start technique 302 of FIG. 3A can be employed to aid in the determination if a new start (e.g., a fresh start) will likely cause damage to the ESG 408 of FIG. 4. If the start thermal stress predictor 418 predicts an ESG thermal state that the ESG and engine lifing limits logic 414 determines is out of the predetermined ESG thermal limits, the engine start control 420 can ensure that a start command input by a user such as a pilot is aborted.

It is contemplated that the ESG 408 of system 400 may be free of temperature sensors. Further, is contemplated that the active ESG(s) discussed above with respect to techniques 302-306, respectively of FIGS. 3A-3C, may also be free of temperature sensors. Accordingly, it is contemplated that the ESG torque commands, such as ESG torque command 436 of FIG. 4, and FMV commands, such as FMV command 434, are determined without reliance on temperature sensor information from the ESG (e.g., ESG 408). As such, system costs and weights can be reduced. Further, the problems that a damaged or failed ESG sensor (not shown) may cause are avoided.

Computing devices such as system 10 of FIG. 1 generally include computer-executable instructions such as the instructions of the system controller 18, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C#, Objective C, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A gas turbine engine starting system comprising:
an electric start generator (ESG) free of temperature sensors and configured to provide torque to a gas turbine engine, wherein the ESG comprises a plurality of subcomponents;
a fuel metering module configured to provide a quantity of fuel to the gas turbine engine; and
an electronic control system (ECS) that:
determines a future temperature of the ESG based on a plurality of historical ESG thermal trending information and an input ambient temperature;
determines whether at least one of an ongoing start and an uninitiated start will be unsuccessful, wherein the determination of whether at least one of the ongoing start and the uninitiated start will be unsuccessful is based on the future temperature of the ESG; and
indicates the determination of whether at least one of the ongoing start and the uninitiated start will be unsuccessful to an operator.

2. The gas turbine engine starting system of claim 1, wherein the ECS further:
causes the fuel metering module to provide the quantity of fuel to the gas turbine engine; and
aborts the ongoing start based on the future temperature of the ESG.

3. The gas turbine engine starting system of claim 1, wherein the determination of whether at least one of the ongoing start and the uninitiated start will be unsuccessful is further based on a comparison of the future temperature and a first thermal limit of the ESG.

4. The gas turbine engine starting system of claim 1, wherein the ECS comprises:
a full authority digital engine control (FADEC) unit that:
identifies a proposed ESG amperage change condition, wherein the proposed ESG amperage change condition proposes at least one of an ESG stator amperage be driven at a first different stator amperage and an ESG field amperage be driven at second different field amperage;
determines an ESG temperature based on the proposed ESG amperage change condition, wherein ESG temperature is a predicted temperature of the ESG if driven by the proposed ESG amperage change condition; and
determines whether the ESG temperature exceeds a thermal limit of the ESG.

5. The gas turbine engine starting system of claim 4, further comprising an ESG control unit that controls the ESG, wherein the ECS further:
determines an ESG torque command based on the proposed ESG amperage change condition; and
sends the ESG torque command to the ESG control unit if the predicted ESG temperature fails to exceed the thermal limit.

6. The gas turbine engine starting system of claim 1, wherein the determination of whether the future temperature of the ESG is further based on a sensed gas turbine engine oil temperature.

7. The gas turbine engine starting system of claim 6, wherein the ECS further determines a plurality of ESG subcomponent temperatures based on a plurality of ESG subcomponent heat capacity values.

8. The gas turbine engine starting system of claim 1, wherein the ECS further:
determines a present temperature of at least one of the ESG and the plurality of subcomponents, wherein the present temperature is based on at least one of a sensed amperage, an sensed speed, a sensed coolant temperature, and a sensed ambient air temperature; and
aborts the ongoing start if the present temperature exceeds a thermal limit.

9. A gas turbine engine starting system comprising:
a systems controller that:
receives a plurality of sensor inputs, wherein the plurality of sensor inputs comprises a sensed engine speed and a sensed ambient air temperature;
determines a future temperature of at least one subcomponent of an electrical start generator (ESG), wherein the prediction of the future temperature is based on the plurality of sensor inputs and a plurality of ESG historical thermal information; and
stores the future temperature on a non-transitory storage medium.

10. The gas turbine engine starting system of claim 9, further comprising an ESG free of temperature sensors and that outputs a quantity of torque to a gas turbine engine, wherein the ESG comprises the plurality of ESG subcomponents.

11. The gas turbine engine starting system of claim 10, wherein the plurality of sensor inputs further comprises a sensed engine temperature and a sensed engine coolant temperature, and wherein the determination of the future temperature of each subcomponent of the plurality of ESG subcomponents is further based on the sensed engine temperature and the sensed engine coolant temperature.

12. The gas turbine engine starting system of claim 11, wherein the systems controller further determines whether a sensed engine system temperature exceeds an engine thermal limit.

13. The gas turbine engine starting system of claim 11, wherein the systems controller further:
determines a quantity of fuel a fuel metering module will provide to a gas turbine engine;
causes the fuel metering module to provide the quantity of fuel to the gas turbine engine;
determines an quantity of ESG torque the ESG will provide to the gas turbine engine; and
causes the ESG to provide the quantity of ESG torque to the gas turbine engine.

14. The gas turbine engine starting system of claim 11, wherein the systems controller further:
determines whether an active starting operation will cause the ESG to exceed an ESG thermal limit and cause the gas turbine engine to exceed an engine thermal limit, and
wherein the determination whether the active starting operation will cause the ESG to exceed the ESG thermal limit is based on the future temperature of each subcomponent of the plurality of ESG subcomponents.

15. The gas turbine engine starting system of claim 11, wherein the systems controller further aborts an ongoing ESG operation based on the future temperature of each subcomponent of the plurality of ESG subcomponents.

16. The gas turbine engine starting system of claim 10, wherein the systems controller further:
determines a present temperature of at least one subcomponent of the ESG based on at least one of a sensed amperage, a sensed speed, a sensed coolant temperature, and a sensed ambient air temperature;
compares at least one of the present temperature and the future temperature to a thermal limit; and based on the comparison, identifies at least one of a lifespan of the ESG and an abort condition of an ongoing start condition.

17. The gas turbine engine starting system of claim 9, wherein the systems controller further:
models a present temperature of the least one subcomponent of the ESG during a start operation;
identifies at least one trend in a plurality of recorded modeled temperatures of the at least one subcomponent of the ESG, wherein the plurality of modeled temperature includes the present temperature; and
determines a health property of the ESG based on the at least one trend.

18. A method of starting a gas turbine engine comprising:
receiving a plurality of sensor information, wherein the plurality sensor information includes sensed engine speed, sensed ambient temperature, and sensed oil temperature;
modifying a first starting condition for an electric starting generator (ESG) based on the plurality of sensor information and a plurality of historical ESG thermal information, wherein the plurality of historical ESG thermal information includes a plurality of historical temperature data of a respective plurality of ESG subcomponents; and
sending the first starting condition to an ESG controller that controls the ESG.

19. The method of claim 18, further comprising:
determining a first temperature of the ESG, wherein the first temperature of the ESG is based on the plurality of historical ESG thermal information, wherein the first temperature is below a thermal limit of the ESG; and
determining whether the ESG operating at the first starting condition will rise to a second temperature above the thermal limit of the ESG, wherein the ESG is absent temperature sensing components.

20. The method of claim 18, further comprising:
modeling a present temperature of the ESG; and
determining whether the present temperature does not exceed a thermal limit, wherein modifying the first starting condition comprises adjusting an ESG amperage and an engine fuel quantity to increase a lifespan of the ESG and the gas turbine engine.

* * * * *